3,074,824
REMOVING FLUX RESIDUES
Wayne W. Binger, Lower Burrell, and Basil M. Ponchel, Arnold, Pa., assignors to Aluminum Company of America, Pittsburgh, Pa., a corporation of Pennsylvania
No Drawing. Filed Mar. 16, 1962, Ser. No. 180,313
1 Claim. (Cl. 134—28)

This invention relates to a method of removing flux residues from an aluminum assembly, particularly removing chloride-fluoride containing fluxes clinging to a brazed aluminum assembly. As used herein the word aluminum includes high purity aluminum, aluminum in various commerical grades and aluminum base alloys.

Fluxes commonly used in welding and brazing aluminum contain chlorides and fluorides. These chemicals can cause corrosion if they are allowed to remain on the joined assembly. It is therefore commonly recognized that it be essential to clean the assembly after joining. A thorough water rinse followed by an acid treatment is usually used. The acids commonly used are nitric acid, nitric acid-hydrofluoric acid mixtures, hydrofluoric acid, and nitric acid-dichromate solution. Nitric acid is sometimes objectionable for removing flux from assemblies with substantial quantities of flux to be taken off. The fluxes and nitric acid react to produce fumes. The nitric-hydrofluoric solution must be used for a very short time to limit the amount of etching. A hydrofluoric acid solution must react with the aluminum to be effective and its time of employment should be short. Nitric-chromate solutions are useful where some residual resistance to corrosion is desired but such solutions will not tolerate substantial contamination with flux salts without becoming corrosive in themselves.

A problem has been encountered in the removal of flux from thin gage brazed aluminum assemblies, since seeper leaks sporadicallly develop in such assemblies. These are perforations which are found to result from intergranular attack initiated during the flux removal operation. The problem is particularly acute in the case of thin aluminum sections, around .010 to .015 inch thick, but the problem is not confined to such thin components. Further, while seeper leaks may sometimes be observed during and shortly after the flux removal operations, in many cases they develop later, during storage or use of the joined assemblies. The development of seeper leaks appears to be related to the composition of the flux removal solutions, the degree of flux contamination in the solution, and the amount of residual flux on the aluminum surface. In fact, commonly used flux removal solutions have been found to promote intergranular attack on the aluminum when only a small pocket of flux clings to the assembly.

An object of this invention is to provide a flux removal procedure for use on joined aluminum assemblies that will minimize the occurrence of seeper leaks. In particular an object is to provide a flux removal procedure which will avoid initiation and promotion of intergranular attack on aluminum components of brazed aluminum assemblies.

In accordance with the invention, as with prior flux removal procedures, it is most desirable to rinse off as much of the chloride-fluoride containing flux from a joined aluminum assembly as possible with hot water, preferably boiling water. Nevertheless, it is almost impossible to so assure removal of all chloride-fluoride containing flux clinging to brazed aluminum assemblies.

It has now been found, in accordance with the invention, that residual chloride-fluoride containing flux clinging to such assemblies may best be removed by immersing the assemblies in an aqueous acid solution that will rapidly remove the flux without promoting any appreciable attack on the aluminum. The solution should be one having a pH of about 4.6 and consisting essentially of soluble dihydrogen phosphate in an amount equivalent to about 28 pounds sodium dihydrogen phosphate ($NaH_2PO_4 \cdot H_2O$), soluble chromate in an amount equivalent to about 13 pounds sodium chromate
($NaCr_2O_7 \cdot 2H_2O$)
and soluble bifluoride in an amount equivalent to about 3½ pounds sodium bifluoride ($NaHF_2$) per 100 gallons of water. This solution is preferably used at a temperature of about 140° F. and the immerision period should be about 5 to 20 minutes. Thereafter the joined assemblies should again be rinsed in hot or cold water.

We have preferred to employ a solution having the following composition:

| | | |
|---|---|---|
| $NaH_2PO_4 \cdot H_2O$ | pounds | 28 |
| $Na_2Cr_2O_7 \cdot 2H_2O$ | do | 13 |
| $NaHF_2$ | do | 3.5 |
| Water | gallons | 100 |

We have used such a solution to remove residual brazing flux of various compositions from aluminum assemblies of various grades and alloys. A number of our tests were made for the removal of a flux containing about 40% potassium chloride, 30% calcium chloride, 23% sodium chloride, 3% strontium chloride, 2% aluminum chloride and 2% cryolite. The percentages given are on a weight basis. It was found that the aqueous acid solution described had a flux tolerance greater than 100 grams per liter, without intergranular corrosion attack and with only a minimum amount of pitting attack on aluminum. All other conventional flux removal media, except for water itself (which is not in many cases an adequate final flux removal media), resulted in intergranular corrosion attack in the presence of flux on the assembly. While we have chosen to use sodium compounds of the phosphate, chromate and fluoride components of the flux removal solution in most of our work, any of the soluble compounds of these components, such as the alkali metal compounds (including ammonium compounds), may be substituted for the sodium compounds. Compounds producing about the same solution acidity as that mentioned above, should be employed in amounts and proportions approximately equivalent to those indicated above for the sodium compounds.

Numerous modifications and variations in the aqueous acid solution may be made in the scope of the invention.

We claim:
A method of removing flux residues from an aluminum assembly comprising:
rinsing a joined aluminum assembly, having chloride-fluoride-containing flux clinging thereto, with hot water,
immersing said assembly in an aqueous acid solution having a pH of about 4.6 and consisting essentially of a soluble dihydrogen phosphate in an amount equivalent to about 28 pounds sodium dihydrogen phosphate ($NaH_2PO_4 \cdot H_2O$), a soluble chromate in an amount equivalent to about 13 pounds sodium chromate ($NaCr_2O_7 \cdot 2H_2O$) and a soluble bifluoride in an amount equivalent to about 3½ pounds sodium bifluoride ($NaHF_2$) per 100 gallons of water, at a temperature of about 140° F., for about 5 to 20 minutes,
and thereafter rinsing said assembly in water.

References Cited in the file of this patent

UNITED STATES PATENTS

| | | |
|---|---|---|
| 2,438,877 | Spruance | Mar. 30, 1948 |
| 2,593,448 | Hesch | Apr. 22, 1952 |
| 2,748,035 | Duncan | May 29, 1956 |
| 2,867,514 | Newhard et al. | Jan. 6, 1959 |
| 2,883,311 | Halpert | Apr. 21, 1959 |

FOREIGN PATENTS

| | | |
|---|---|---|
| 627,273 | Great Britain | Aug. 4, 1949 |